I. F. BILBRO.
COMBINED RAKE AND PITCHFORK.
APPLICATION FILED JAN. 4, 1911.
1,041,416.
Patented Oct. 15, 1912.
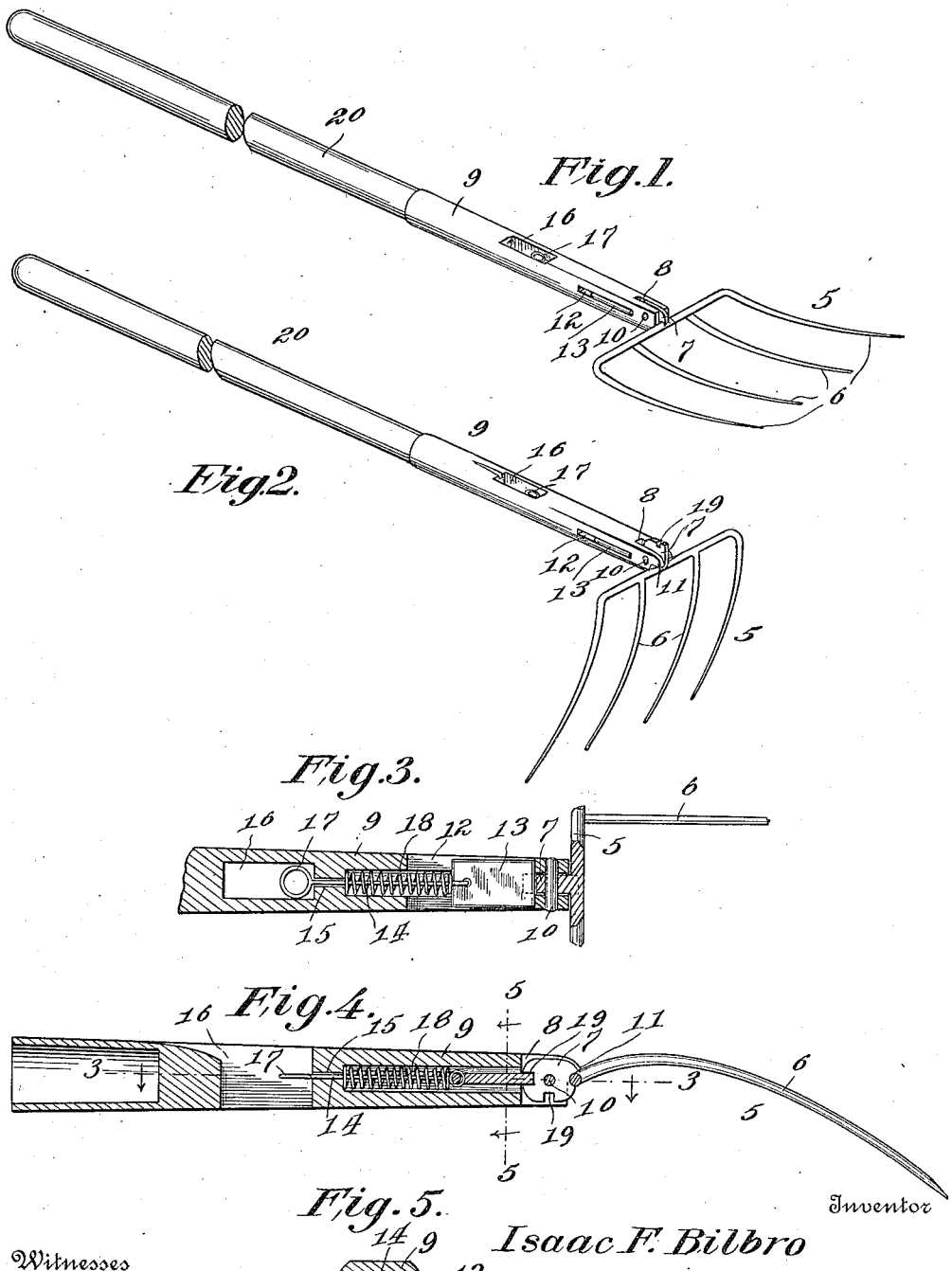
Witnesses
N. H. Lybrand
H. O. Faulkner
Inventor
Isaac F. Bilbro
By 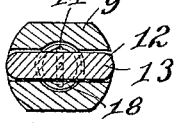
Attorney

UNITED STATES PATENT OFFICE.

ISAAC F. BILBRO, OF WETUMPKA, ALABAMA.

COMBINED RAKE AND PITCHFORK.

1,041,416.  Specification of Letters Patent.  Patented Oct. 15, 1912.

Application filed January 4, 1911. Serial No. 600,734.

*To all whom it may concern:*

Be it known that I, ISAAC F. BILBRO, a citizen of the United States, residing at Wetumpka, in the county of Elmore and State of Alabama, have invented new and useful Improvements in Combined Rakes and Pitchforks, of which the following is a specification.

The invention relates to a fork, and more particularly to the class of combined rakes and forks.

The primary object of the invention is the provision of a combination tool of this character in which the head may be adjusted, whereby the implement may be used either as a fork or rake, and the head, when adjusted, will be locked against accidental movement.

Another object of the invention is the provision of a combination implement of this character, in which the rake or fork head thereof is pivotally mounted for arcuate movement, whereby it may be swung into alinement with the handle, or at a suitable angle thereto, thus enabling the implement to be converted for use either as an ordinary rake for cleaning purposes, or a fork for lifting or carrying hay and straw from one point to another.

A further object of the invention is the provision of a combination implement which is simple in construction, strong, readily and easily adjusted, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of a combination implement constructed in accordance with the invention. Fig. 2 is a view similar to Fig. 1, showing the implement adjusted for use as a rake. Fig. 3 is a fragmentary transverse section through the implement. Fig. 4 is a vertical longitudinal sectional view thereof. Fig. 5 is a sectional view on the line 5—5 of Fig. 4.

Similar reference characters indicate corresponding parts throughout the several views of the drawings.

Referring to the drawings by numerals, the implement comprises a fork head 5, having the usual tines 6, the head being provided medially with a rearwardly extending ear 7, the same being fitted in a bifurcation 8 opening through one end of a ferrule 9, and this ear is connected to the ferrule by means of a pivot pin 10, the latter being secured in the ferrule and intersecting bifurcations therein, whereby the head 5 may be swung at right angles to the ferrule. This ferrule 9 at its bifurcated end is formed with stop extensions 11, the latter engaging the head when the same has been shifted into alinement with the ferrule, thereby bracing the said fork head, so that the same will sustain heavy loads to be carried thereby.

At substantially right angles to the bifurcation 8 and formed in the ferrule 9 is a guide opening 12, in which is slidably fitted a locking member or catch 13, the same being preferably in the form of a flat elongated plate and to which is connected one end of a pull rod 14, the same being loosely mounted in a suitable bore 15 formed in the ferrule 9, the bore 15 opening into a suitable cavity 16 and is formed with an eye 17 which is adapted to be engaged by the hand of the user of the implement, whereby the said pull rod 14 may be actuated for releasing the locking catch or member 13.

Surrounding the pull rod 14 is a coiled expansion spring 18, one end of which is engaged with the wall of the opening 12, while its opposite end is engaged with the locking catch or member 13, the spring being adapted to normally hold the said member or catch in engagement in notches 19 formed in the ear 7, one notch being disposed at a suitable angle to the other, thus when the locking member or catch 13 is engaged with one of the notches, it will hold the head 5 in adjusted position and against accidental displacement. By reason of the disposition of the notches 19 in the ear 7 on the head 5, the latter may be held either in alinement with the ferrule 9 or at a suitable angle thereto, whereby it may be used as a rake or fork in the ordinary manner.

Suitably fitted in the ferrule is the usual handle 20 which may be of any desirable length for the proper manipulation of the implement.

What is claimed is:

1. An implement of the class described comprising a ferrule having a socket in one end for detachably receiving a handle and a bifurcation in the opposite end and also an opening spaced therefrom, a tined head having an ear pivotally connected in the bifurcation in the end of the ferrule the said ear being provided with notches, a locking member slidably mounted in said ferrule and adapted for engagement with either of said notches, a spring held pull rod working within the ferrule and having connection with said locking member, and an eye formed on the rod in alinement therewith and disposed medially within the opening in the ferrule, the said bifurcated end being cut away to provide abutment shoulders for engagement by the tined head to limit its arcuate movement in reverse directions.

2. An implement of the class described, comprising a ferrule having a bifurcated end and an opening spaced therefrom, a tined head having an ear pivotally connected in the bifurcation in the end of the ferrule, the said ear being provided with notches, a locking member adapted for engagement with either of said notches, a spring-held pull rod working within the ferrule and having connection with said locking member, an eye formed on the rod in alinement therewith and disposed medially within the opening in the ferrule, and stop extensions on the bifurcated end of the ferrule for abutment of the head therewith when shifted into alinement with the ferrule.

In testimony whereof I affix my signature in presence of two witnesses.

ISAAC F. BILBRO.

Witnesses:
J. CURTIS WELDON,
JOHN A. GADDIS.

---

Copies of this patent may be obtained for five cents each, by addressing the "Commissioner of Patents, Washington, D. C."